US008954760B2

(12) United States Patent
Kundu et al.

(10) Patent No.: US 8,954,760 B2
(45) Date of Patent: Feb. 10, 2015

(54) AUTHENTICATION OF SOLUTION TOPOLOGY

(71) Applicant: International Business Machines Corporation, Armonk, NY (US)

(72) Inventors: Ashish Kundu, Elmsford, NY (US); Ajay Mohindra, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/733,505

(22) Filed: Jan. 3, 2013

(65) Prior Publication Data
US 2014/0181058 A1  Jun. 26, 2014

Related U.S. Application Data

(63) Continuation of application No. 13/723,913, filed on Dec. 21, 2012.

(51) Int. Cl.
*G06F 17/30* (2006.01)
*G06F 21/64* (2013.01)
*G06F 9/455* (2006.01)

(52) U.S. Cl.
CPC ............ *G06F 21/64* (2013.01); *G06F 9/45504* (2013.01); *G06F 17/30129* (2013.01)
USPC ....................................................... 713/193

(58) Field of Classification Search
CPC ............................... G06F 21/64; H04L 9/3247
See application file for complete search history.

(56) References Cited

U.S. PATENT DOCUMENTS

| 7,770,000 | B2 | 8/2010 | Schunter et al. | |
|---|---|---|---|---|
| 7,779,136 | B2 | 8/2010 | Krishnan | |
| 7,890,762 | B2 | 2/2011 | Dietl et al. | |
| 8,180,049 | B2 | 5/2012 | Gentry | |
| 8,266,676 | B2 | 9/2012 | Andersen et al. | |
| 2008/0098462 | A1* | 4/2008 | Carter | 726/4 |
| 2008/0163194 | A1* | 7/2008 | Dias et al. | 717/174 |
| 2009/0089860 | A1 | 4/2009 | Forrester et al. | |
| 2009/0150982 | A1 | 6/2009 | Kim | |
| 2010/0049968 | A1 | 2/2010 | Dimitrakos et al. | |
| 2010/0161998 | A1 | 6/2010 | Chen et al. | |
| 2012/0191979 | A1 | 7/2012 | Feldbau | |

(Continued)

OTHER PUBLICATIONS

Selvi et al., "Identity Based Self Delegated Signature-Self Proxy Signatures," Fourth International Conference on Network and System Security, Sep. 2010, pp. 568-573.

(Continued)

*Primary Examiner* — Matthew Henning
(74) *Attorney, Agent, or Firm* — Yee & Associates, P.C.; Louis J. Percello

(57) ABSTRACT

A computer implemented method is provided to verify an integrity of a solution. The computer implemented method comprises hashing, by a computer, a set of virtual machine instances in a solution topology of the solution. The computer hashes a set of connections in the solution topology. The set of connections comprising a connection between ones of the set of virtual machine instances, a connection between a first component of a first one of the set of virtual machine instances and a second component of a second one of the set of virtual machine instances, and combinations thereof. The computer hashes a set of solution-specific information, and then signs the hashes to create a first signed topology.

25 Claims, 9 Drawing Sheets

(56) References Cited

U.S. PATENT DOCUMENTS

2012/0239935 A1 9/2012 Osborne et al.
2013/0151975 A1* 6/2013 Shadi et al. ................ 715/734

OTHER PUBLICATIONS

Sunitha et al., "Forward-Secure Proxy Signature Scheme for Multiple Proxy Signers Using DSA With Proxy Revocation," IEEE International Advance Computing Conference, Mar. 2009, pp. 681-686 (Abstract Only).

U.S. Appl. No. 13/723,913, filed Dec. 21, 2012, 52 pages.

Office Action, dated Mar. 28, 2014, regarding U.S. Appl. No. 13/723,913, 19 pages.

* cited by examiner

AUTHENTICATION OF SOLUTION TOPOLOGY

This application is a continuation of application Ser. No. 13/723,913, filed Dec. 21, 2012, status pending.

BACKGROUND

1. Field

The disclosure relates generally to the verification of authenticity (integrity and origin) of the content. More specifically, the disclosure relates to a computer implemented method, a computer program product, and a data processing system for verifying authenticity of solution topologies, i.e., the solution components and topologies are not deployed/modified in an unauthorized manner.

2. Description of the Related Art

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

SUMMARY

According to one embodiment of the present invention, a computer implemented method is provided to verify an integrity of a solution. The computer implemented method comprises hashing, by a computer, a set of virtual machine instances in a solution topology of the solution. The computer hashes a set of connections in the solution topology. The set of connections comprising a connection between ones of the set of virtual machine instances, a connection between a first component of a first one of the set of virtual machine instances and a second component of a second one of the set of virtual machine instances, and combinations thereof. The computer hashes a set of solution-specific information, and then signs the hashes to create a first signed topology.

DETAILED DESCRIPTION

Figure 1:
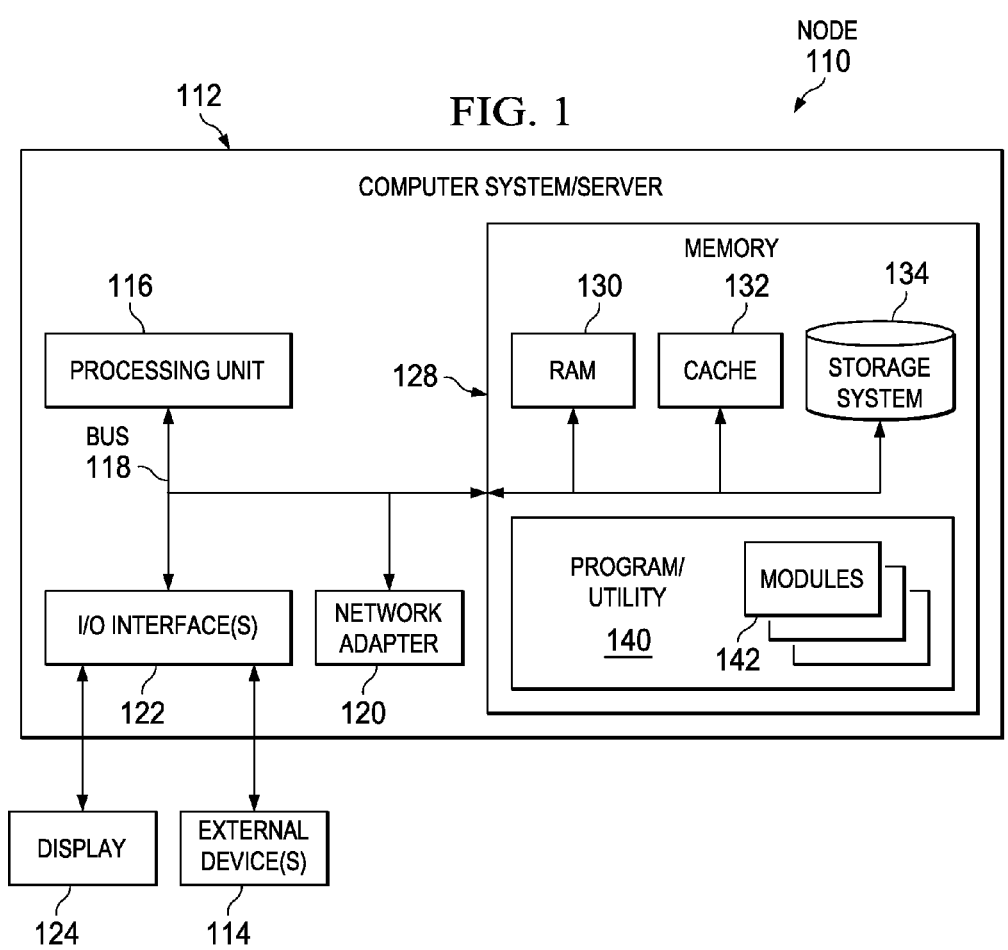
FIG. 1 is a schematic of an example of a cloud computing node depicted in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.\

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is depicted in accordance with an illustrative embodiment. Cloud computing node 110 is only one example of a suitable cloud computing node and is not intended to suggest any limitation as to the scope of use or functionality of the illustrative embodiments described herein. Regardless, cloud computing node 110 is capable of being implemented and/or performing any of the functionality set forth hereinabove.

Cloud computing node 110 comprises computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

1. Computer system/server 112 may be described in the general context of computer system executable instructions, such as program modules being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general purpose computing device. The components of computer system/server 112 may include, but are not limited to, one or more processors or processor unit 116, system memory 128, and bus 118 that couples various system components including system memory 128 to processor unit 116.

Processor unit 116 executes instructions for software that may be loaded into system memory 128. Processor unit 116 may be a number of processors, a multi-processor core, or some other type of processor, depending on the particular implementation. A number, as used herein with reference to an item, means one or more items. Further, processor unit 116 may be implemented using a number of heterogeneous processor systems in which a main processor is present with secondary processors on a single chip. As another illustrative example, processor unit 116 may be a symmetric multi-processor system containing multiple processors of the same type.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112 and it includes volatile media, non-volatile media, removable media, and non-removable media.

System memory 128 can include computer system readable media in the form of volatile memory, such as random access memory (RAM) 130 and/or cache memory 132. Computer system/server 112 may further include other removable/non-removable and volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM, or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the illustrative embodiments.

Program/utility 140, having a set (at least one) of program modules 142, may be stored in memory 128 by way of example and not limitation, as well as an operating system, one or more application programs, other program modules, and program data. Each of the operating systems, one or more application programs, other program modules, and program data or some combination thereof may include an implementation of a networking environment. Program modules 142 generally carry out the functions and/or methodologies of the illustrative embodiments as described herein.

Computer system/server 112 may also communicate with one or more external devices 114, such as a keyboard, a pointing device, display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks, such as a local area network (LAN), a general wide area network (WAN), and/or a public network (e.g., the Internet) via network adapter 120. As depicted, network adapter 120 communicates with the other components of computer system/server 112 via bus 118. It should be understood that, although not shown, other hardware and/or software components could be used in conjunction with computer system/server 112. Examples include, but are not limited to, microcode, device drivers, redundant processing units, external disk drive arrays, RAID systems, tape drives, and data archival storage systems, etc.

Figure 2:
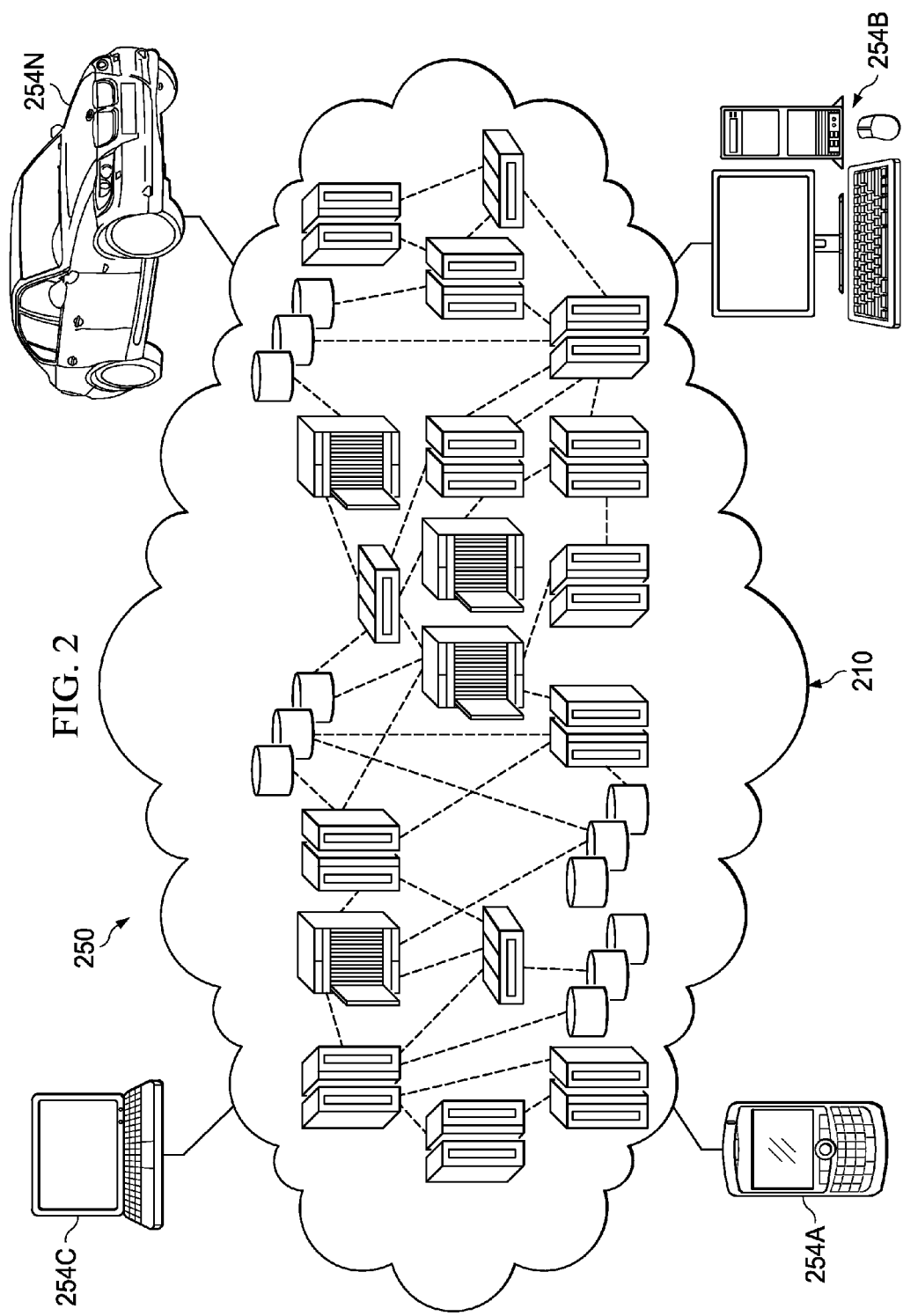
FIG. 2 is an illustration of a cloud computing environment depicted in accordance with an illustrative embodiment.

Referring now to FIG. 2, an illustration of a cloud computing environment is depicted in accordance with an illustrative embodiment. In this illustrative example, cloud computing environment 250 comprises one or more cloud computing nodes 210 with which local computing devices used by cloud consumers may communicate. For example, cloud computing node 110 in FIG. 1 is one example of cloud computing nodes 210. Local computing devices which may communicate with cloud computing nodes 210 may include, for example, personal digital assistant (PDA) or cellular telephone 254A, desktop computer 254B, laptop computer 254C, and/or automobile computer system 254N. Cloud computing nodes 210 may communicate with one another. They may be grouped (not shown) physically or virtually, in one or more networks, such as private, community, public, or hybrid clouds as described hereinabove or a combination thereof. This allows cloud computing environment 250 to offer infrastructure, platforms, and/or software as services for which a cloud consumer does not need to maintain resources on a local computing device. It is understood that the types of computing devices 254A, 254B, 254C, and 254N shown in FIG. 2 are intended to be illustrative only and that cloud computing nodes 210 and cloud computing environment 250 can communicate with any type of computerized device over any type of network and/or network addressable connection (e.g., using a web browser). Program code located on one of cloud computing nodes 210 may be stored on a computer recordable storage medium in one of cloud computing nodes 210 and downloaded to a computing device within computing devices 254A, 254B, 254C, and 254N over a network for use in these computing devices. For example, a server computer in cloud computing nodes 210 may store program code on a computer readable storage medium on the server computer. The server computer may download the program code to a client computer in computing devices 254A, 254B, 254C, and 254N for use on the client computer.

Figure 3:
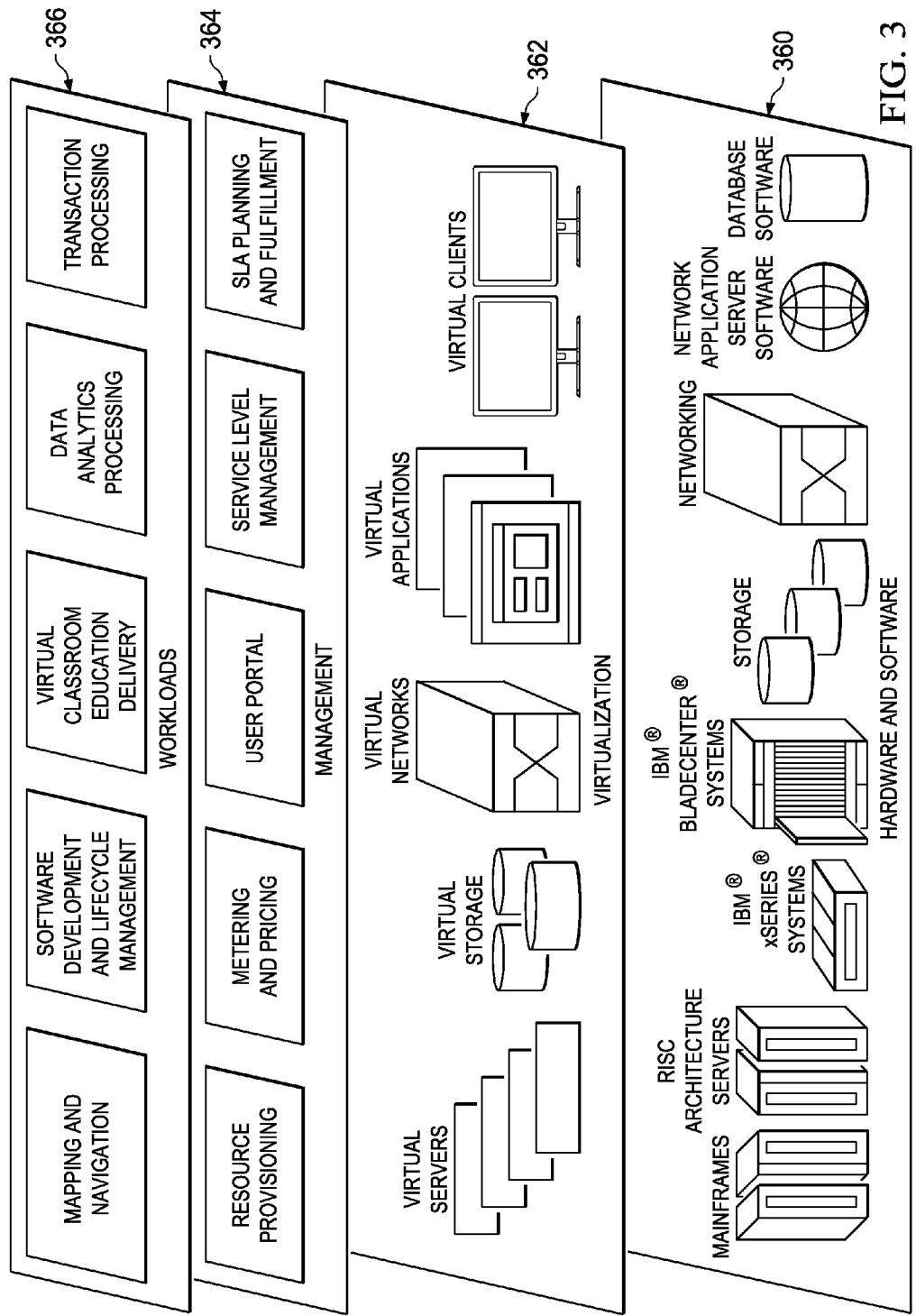
FIG. 3 is a set of functional abstraction layers depicted in accordance with an illustrative embodiment.

Referring now to FIG. 3, a set of functional abstraction layers is depicted in accordance with an illustrative embodiment. The set of functional abstraction layers may be provided by cloud computing environment 250 in FIG. 2. It should be understood in advance that the components, layers, and functions shown in FIG. 3 are intended to be illustrative only and illustrative embodiments are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; and networks and networking components. Examples of software components include network application server software, in one example IBM® WebSphere® application server software; and database software, in one example IBM® DB2® database software. (IBM®, zSeries®, pSeries®, xSeries®, BladeCenter®, WebSphere®, and DB2® are trademarks of International Business Machines Corporation registered in many jurisdictions worldwide.)

Virtualization layer 362 provides an abstraction layer from which the following examples of virtual entities may be provided: virtual servers; virtual storage; virtual networks including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and pricing provide usage and cost tracking as resources are utilized within the cloud computing environment and billing or invoicing for consumption of these resources. In one example, these resources may comprise application software licenses. Security provides identity verification for cloud consumers and tasks as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload monitoring, management, and security processing.

In a traditional information technology infrastructure, this physical security was largely implemented due to the configuration topology of the servers and clients themselves. The simple fact that it is hard to root removed were at a physical server or client, or hard to change the physical configuration topology provided physical security for the system.

However these physical impediments do not up are inapplicable to a cloud information technology infrastructure. Virtual machines are easy to create, destroy, new, migrate, and clone. The web-based access protocol itself is a weekly in the physical security, providing easy access to the virtual machines. Furthermore the PEs in which virtual machines can be created, migrated, or cloned has increased the number of virtual machines, such that the scale of managing physical security of virtual machines is a much bigger problem in traditional physical information technology infrastructure.

Insider threat or intruder may not be able to steal a virtual machine. However, that insider threat or intruder may be able to move the virtual machines from one solution to another. Furthermore the insider threat can inject additional or unwanted virtual machines to an already complex solution.

Prior attempts at cloud security have not considered integrity verification of class solutions in a holistic manner Existing works do not address the notion of "identity of a VM with respect to a solution." Most schemes focus either on integrity of data or software package or the running OS. With cloud infrastructure, there is a need to focus on solution-level integrity, including integrity verification of solution registry, and solution meta-data. Existing works do not address integrity verification of cloud solution registry.

Illustrative embodiments herein provide a method for determining whether a virtual machine belongs to a correct solution, or group. Furthermore, illustrative embodiments provide a method determining whether you virtual machine is logically in the correct place within a solution's topology. Illustrative embodiments provide a method for determining whether a solution includes virtual machine instances, and the topology of those virtual machine instances.

Illustrative embodiments herein enable solution administrators, dashboards, or users to verify whether a solution and/or VM instances has been modified in any unauthorized manner Illustrative embodiments herein enable a determination of whether a VM instances belongs to a specific solution. Illustrative embodiments herein enable integrity verification of solutions and VM instances on the cloud using multi-party authentication. Illustrative embodiments herein enable integrity verification of the solution registry, and prevent unauthorized modification to the registration system that is used to register a solution.

One such manner of integrity verification of the topology, solutions, virtual machine instances, and solution registry is through a digital signature utilizing a computation of hashes. In one such embodiment, a hash of the topology, solutions, virtual machine instances, and solution registry is created using a Merkle hash technique.

Signer—who can sign: the creator, an authorized owner, an entity with the signature authority to sign the specific topology, solutions, virtual machine instances, and solution registry.

Verifier—who can verify the a signed entity with respect to a signature. The signed entity is a topology. Anyone who has access to the topology can act as a verifier. A client may choose to verify the signature of part of the topology or the whole topology, part of a solution or an image.

Redaction: redaction is the process of removing certain parts from a signed entity such as a topology or a solution. A redactor is the one who carries out the process of redaction. A redactable signature is the one that allows signing a complete image, redacting certain parts of the topology, solutions, virtual machine instances, and solution registry and computing the signature of the redacted topology, solutions, virtual machine instances, and solution registry, and verifying the authenticity of the redacted topology, solutions, virtual machine instances, and solution registry.

Computation of signatures: Digital signature of the topology, solutions, virtual machine instances, and solution registry is computed by signing the Merkle hash or using an aggregate signature such as the Condensed-RSA or Elliptic Curve based aggregate signatures, redactable signatures, or sanitizable signatures.

Verification of authenticity: Authenticity is verified by validating the signature of the topology, solutions, virtual machine instances, and solution registry.

A topology or solution can be represented as a flat file, as a list of chunks, as a tree or as a graph. The chunks may be of uniform sizes or of different sizes. In a flat file-based image, an illustrative embodiment computes a hash in a manner similar to computing the hash of a string.

Condensed signature: The aggregate signature scheme computes the aggregate signature of the topology, solutions, virtual machine instances, or solution registry. Groups of chunks of the topology, solutions, virtual machine instances, or solution registry are signed and the signatures are aggregated. This process is carried out by the condensed signature schemes (such as condensed RSA signature schemes). A provisioning service receiving the chunks also receives the aggregate signature for the topology, solutions, virtual machine instances, or solution registry. The provisioning service follows the aggregate signature protocol in order to verify the authenticity of the chunks. If a client wants to or can only verify the authenticity of some but not all chunks, then the client receives cryptographic details for the verification.

Thus, illustrative embodiments of the present invention provide a computer implemented method a computer implemented method to verify an integrity of a solution. The computer implemented method comprises hashing, by a computer, a set of virtual machine instances in a solution topology of the solution. The computer hashes a set of connections in the solution topology. The set of connections comprising a connection between ones of the set of virtual machine instances, a connection between a first component of a first one of the set of virtual machine instances and a second component of a second one of the set of virtual machine instances, and combinations thereof. The computer hashes a set of solution-specific information, and then signs the hashes to create a first signed topology.

Figure 4:
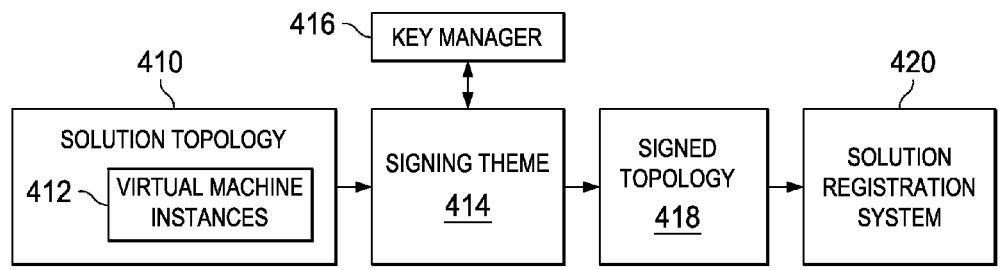
FIG. 4 is a data flow for signing solution topologies and virtual machine instances is shown according to an illustrative embodiment.

Referring now to FIG. 4, a data flow for signing solution topologies and virtual machine instances is shown according to an illustrative embodiment. Solution topology signing system 400 can execute within a management layer of a cloud computing environment, such as management layer 364 of FIG. 3.

Solution topology 410 is a set of virtual machines, dependency/network connectivity between the set of virtual machines, firewall/VLAN/VPN that protects the solution, a list of cloud identifiers, and access control gateways. Each of the virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Solution topology 410 includes a set of virtual machine instances 412. Set of virtual machine instances 412 includes one or more virtual machines. Each of the virtual machines within a set of virtual machine instances 412 is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Solution topology 410, including the set of virtual machine instances 412, is forwarded to signing scheme 414. Signing scheme 414 is a signing policy and associated hash functions that directs the use of and subsequently uses those certain hash functions for hashing Solution topology 410, including the set of virtual machine instances 412.

A topology or solution can be represented as a flat file, as a list of chunks, as a tree or as a graph. The chunks may be of uniform sizes or of different sizes. In a flat file-based image, an illustrative embodiment computes a hash in a manner similar to computing the hash of a string.

Flat file-based virtual machine images are either distributed as a whole or not at all distributed to a client: Compute the signature of the virtual machine image, by signing the topology or solution using redactable signature algorithm or some other signature scheme. Verification of the signature is carried out as per the signature protocol.

In one illustrative embodiment, for chunk-based virtual machine image distribution, verification of the signature is carried out though a signature and verification of a Merkle hash. A Merkle hash of the virtual machine image is signed. That signature is later verified in order to validate authenticity of the virtual machine image.

In one illustrative embodiment, for chunk-based virtual machine image distribution, verification of the signature uses an aggregate signature scheme such as Condensed RSA scheme or a redactable signature scheme or elliptic curve based scheme.

Condensed signature: The aggregate signature scheme computes the aggregate signature of the topology, solutions, virtual machine instances, or solution registry. Groups of chunks of the topology, solutions, virtual machine instances, or solution registry are signed and the signatures are aggregated. This process is carried out by the condensed signature schemes (such as condensed RSA signature schemes). A provisioning service receiving the chunks also receives the aggregate signature for the topology, solutions, virtual machine instances, or solution registry. The provisioning service follows the aggregate signature protocol in order to verify the authenticity of the chunks. If a client wants to or can only verify the authenticity of some but not all chunks, then the client receives cryptographic details for the verification.

A signer provides digital signatures of virtual machine images and parts of virtual machine images. The signer can utilize any scheme for demonstrating the authenticity of a topology, solutions, virtual machine instances, and solution registry. The signer provides and verifying digital signatures of topology, solutions, virtual machine instances, and solution registry according to a signing policy.

The signing policy is one or more rules used to decide a specific signing scheme. The signing policy includes one or more policies, such as sign flat line, sign as chunks, sign as tree, sign as graph, sign using hash scheme, sign using aggregate signature, sign using redactable signature, and sign using sanitizable signature.

A sign flat file policy is a signing policy that applies a digital signature by the virtual machine image signer to a flat file. The flat file is a data file, such as a stand-alone list, that does not contain any linkages to another file.

A sign as chunks policy is a signing policy that applies a digital signature by the virtual machine image signer to chunks of the virtual machine image. Virtual machine images can be stored within image storage as chunks. Each chunk is a "chunk" of data, or byte pattern, the combination of which sums to the virtual machine image.

A chunking algorithm typically provides a procedure for dividing a virtual machine image into chunks. There are multiple options for the chunking algorithm. In one illustrative embodiment, the chunking algorithm uses the VMI's operating system (OS) pages as chunks. In another illustrative embodiment, the chunking algorithm uses VMI's OS files as chunks. In another illustrative embodiment, the chunking algorithm creates chunks based on the VMI's byte-sequences. For example, a byte-sequence having a certain property can be used by the chunking algorithm to mark the beginning of a new chunk.

A "sign as tree" policy is a signing policy that applies a digital signature by the signer to sign a data structure which containing a tree of summary information about the topology, solutions, virtual machine instances, and solution registry. A hash tree signed by the "sign as tree" policy can be a combination of hash lists and hash chaining.

A "sign as graph" policy is a signing policy that applies a digital signature by the \signer to "sign a graph" containing a summary information about the topology, solutions, virtual machine instances, and solution registry.

A sign using hash scheme policy is a signing policy that directs the use of a certain hash function for hashing a topology, solutions, virtual machine instances, and solution registrymage, or the chunked parts of a topology, solutions, virtual machine instances, and solution registry. For example, in one illustrative embodiment, a hash function could specify that a Merkle hash tree is to be used to create the hash function. A sign using hash function policy could specify that a signature be computed from the hash computed as above.

A sign using aggregate signature policy is a signing policy that applies an aggregate digital signature to a topology, solutions, virtual machine instances, and solution registry, or the chunked parts of a topology, solutions, virtual machine instances, and solution registry. An Aggregate Signature Scheme combines several signatures associated with the different chunks of the document and produces a single signature for the complete document. The size of the aggregated signature is substantially smaller than sum of the sizes of the several signatures.

A sign using redactable signature policy is a signing policy that applies a redactable digital signature scheme to a topology, solutions, virtual machine instances, or solution registry represented as a set of chunks, a tree or a graph. A redactable digital signature permits digitally signed documents to be authenticated while also redacting certain information even after the document has been signed. After redaction, the signature scheme is used to compute the signature of the redacted document from the signature of the original document and certain other information. Thus documents can be authenticated even after some of the content has been modified/redacted, but also permits detection if the content (in the document redacted or as it is) has been altered.

A sign using sanitizable signature policy is a signing policy that applies a sanitizable digital signature scheme to a topology, solutions, virtual machine instances, and solution registry, represented as a set of chunks, a tree or a graph. A sanitizable signature allows designated portions of the document to be modified/sanitized by a semi-trusted censor. The sanitizable signature still produces a valid signature on the document modified/sanitized by the censor. Designated portions of the document are explicitly indicated as modifiable under prior agreement between the signer and the censor. If any other portion of the document is modified, a valid signature cannot be produced.

Signing scheme 414 then registers and associated public/private key which key manager 416. The associated public/private key is a public/private key of a public/private key pair. Key manager 416 is a computer or a server such as computer system/server 112 that receives and serves existing cryptographic keys to users or other programs.

Signing scheme 414 forwards signed topology 418 to solution registration system 420. Signed topology 418 is a hashed set of components, including the virtual machine instances, a set of cloud solutions, and the connectivity between them. Signed topology 418 has been signed utilizing signing scheme 414. Each cloud solution comprises a set of virtual machines, dependency/network connectivity between the set of virtual machines, firewall/VLAN/VPN that protects the solution, a list of cloud identifiers, and access control gateways. Each of the virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Solution registration system 420 is a set of information related to registration of the solution with any listing or catalog or registry of the solutions. Some or all authorized solution is registered in this system.

Figure 5:
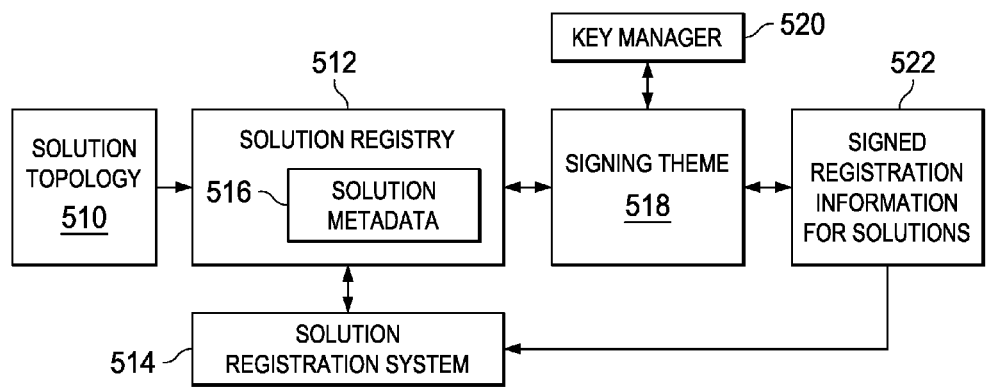
FIG. 5 is a data flow for signing solution registries and solution metadata according to an illustrative embodiment.

Referring now to FIG. 5, a data flow for signing solution registries and solution metadata is shown according to an illustrative embodiment. Solution registry signing system 500 can execute within a management layer of a cloud computing environment, such as management layer 364 of FIG. 3.

Signed topology 510 is a signed topology such as signed topology 418 of FIG. 4. Signed topology 510 is a hashed set of components, including the virtual machine instances, a set of cloud solutions, and the connectivity between them. Each cloud solution comprises a set of virtual machines, dependency/network connectivity between the set of virtual machines, firewall/VLAN/VPN that protects the solution, a list of cloud identifiers, and access control gateways. Each of the virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Signed topology 510 is incorporated into in solution registry 512. Solution registry 512 is a hierarchical database that stores configuration settings and options for the solution of signed topology 510. Signed topology 510 is then registered in solution registration system 514. Signed topology 510 can be referenced with in solution registration system utilizing solution metadata 516 of solution registry 512.

Solution registration system 510 is a solution registration system such as solution registration system 420 of FIG. 4. Solution metadata 516 is metadata about the solution and the virtual machines there in, including such as but not limited to, a name of the virtual machine in solution, a description of the solution, and a unique identifier of the solution, such as a universally unique identifier (UUID). Solution metadata 516 can also include, but not limited to, configuration of the virtual machines within a solution such as the amount of virtual memory and a number of virtual CPUs.

Signing scheme 518 receives solution registry hundred 12. Signing scheme 518 can be a signing scheme, such as but not limited to, signing scheme 414 of FIG. 4. Utilizing a public key/private key retrieved from key manager 520, signing scheme 518 creates signed registration information 522.

Key manager 520 is a key manager such as the key manager 416 of FIG. 4—it manages cryptographic signing and/or verification keys. Signed registration information 522 is a set of information related to registration of the solution with any listing or catalog or registry of the solutions. Signed information includes the signatures of the registration information. Signed registration information 522 is registered within solution registration system 510.

Figure 6:
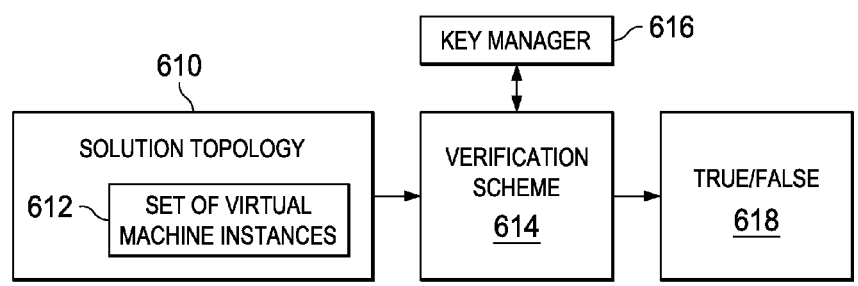
FIG. 6 is a data flow for verifying solution topologies and virtual machine instances according to an illustrative embodiment.

Referring now to FIG. 6, a data flow for verifying solution topologies and virtual machine instances is shown according to an illustrative embodiment. Solution topology verification system 600 can execute within a management layer of a cloud computing environment, such as management layer 364 of FIG. 3.

Solution topology 610 is a solution topology such as solution topology 410 of FIG. 4. Solution topology 610 comprises a set of virtual machines, dependency/network connectivity between the set of virtual machines, firewall/VLAN/VPN that protects the solution, a list of cloud identifiers, and access control gateways. Each of the virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Solution topology 610 includes a set of virtual machine instances 612. Set of virtual machine instances 612 includes one or more virtual machines. Each of the virtual machines within a set of virtual machine instances 612 is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example, but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Solution topology 610, including the set of virtual machine instances 612, is forwarded to verification scheme 614. Verification scheme 614 is a verification policy and associated hash functions that directs the use of and subsequently uses those certain hash functions for verifying solution topology 610, including the set of virtual machine instances 612.

Key manager 616 is a key manager such as team manager 416 of FIG. 4. Key manager 616 is a computer or a server such as computer system/server 112 that receives and serves existing cryptographic keys to users or other programs.

If the verification scheme 614 verifies the solution topology 610 and set of VMs 612 correctly, or part of 612 or 610 as requested by the admin correctly, then the verification scheme returns True 618. By correctly means the integrity and authenticity of the solution topology has not been modified in an unauthorized manner and the signature is used and the keys from key manager are used. Otherwise 614 outputs false 618.

Figure 7:
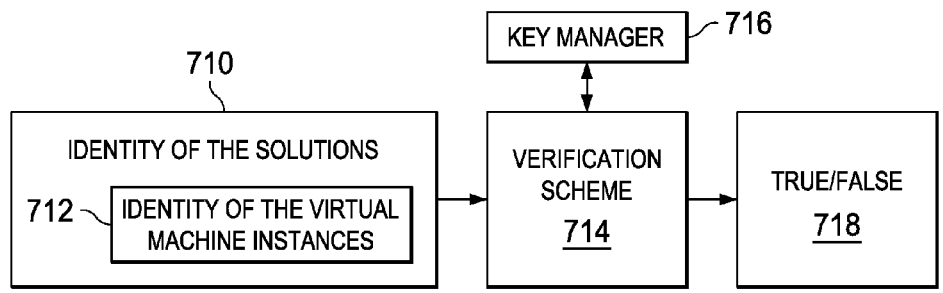
FIG. 7 is a data flow for verifying solution topologies and identities of virtual machine instances according to an illustrative embodiment.

Referring now to FIG. 7, a data flow for verifying solution topologies and identities of virtual machine instances is shown according to an illustrative embodiment. Solution topology verification system 700 can execute within a management layer of a cloud computing environment, such as management layer 364 of FIG. 3.

Identity of the solution 710 is the signature of the solution. That is, identity of the solution 710 is a function of the solution, the signature of the solution, any verification objects, and the public key. Identity of the virtual machine instance 712 is relative to the identity of the solution 710. That is the identity of the virtual machine instance is a function of the virtual machine instance, the signature of the solution, any verification objects, and the public key.

The identity of the solution 710 and the identity of the virtual machine instance 712 are forwarded to verification scheme 714. Verification scheme 714 is a verification policy and associated hash functions that directs the use of and subsequently uses those certain hash functions for verifying identity of the solution 710 and the identity of the virtual machine instance 712.

Key manager 716 is a key manager such as team manager 416 of FIG. 4. Key manager 716 is a computer or a server such as computer system/server 112 that receives and serves existing cryptographic keys to users or other programs.

If the verification scheme 714 verifies the identity of requested solution 710 and/or the set of VMs 712 to be unmodified with respect to the signature(s), then it outputs True else False 718.

Figure 8:
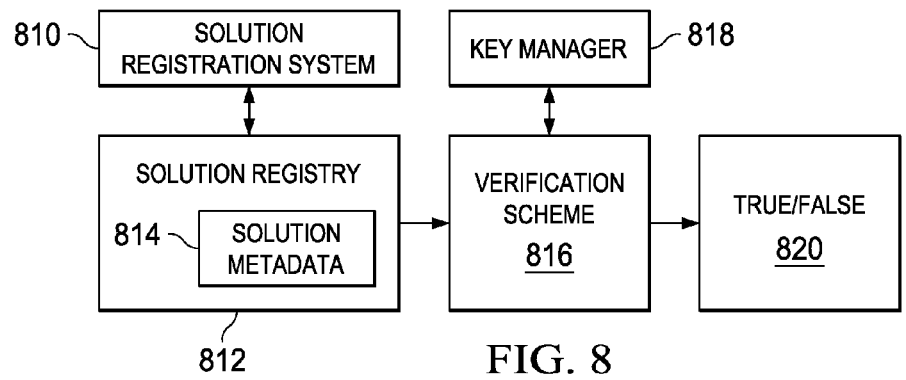
FIG. 8 is a data flow for verifying solution registries and solution metadata according to an illustrative embodiment.

Referring now to FIG. 8, a data flow for verifying solution registries and solution metadata is shown according to an illustrative embodiment. Solution registry verification system 800 can execute within a management layer of a cloud computing environment, such as management layer 364 of FIG. 3.

Solution registration system 810 and is the solution registration system, such as solution registration system 420 of FIG. 4. Solution registration system 810 forward solution 410 of FIG. 4 registry 812 and solution metadata 814 to verification scheme 814. Solution registry 812 is a hierarchical database that stores configuration settings and options for the solution of a signed topology. The Signed topology is then registered in solution registration system 810. The Signed topology can be referenced with in solution registration system 810 utilizing solution metadata 814 of solution registry 812.

Solution metadata 814 is solution metadata such as solution metadata 516 of FIG. 5. Solution metadata 814 is metadata about the solution and the virtual machines there in, including such as but not limited to, a name of the virtual machine in solution, a description of the solution, and a unique identifier of the solution, such as a universally unique identifier (UUID). Solution metadata 516 can also include, but not limited to, configuration of the virtual machines within a solution such as the amount of virtual memory and a number of virtual CPUs.

Verification scheme 816 receives solution registry 812 and solution metadata 814 from solution registration system 810. Verification scheme 816 is a verification policy and associated hash functions that directs the use of and subsequently uses those certain hash functions for verifying identity of solution registry 812 and solution metadata 814.

Key manager 818 is a key manager such as key manager 416 of FIG. 4. Key manager 818 is a computer or a server such as computer system/server 112 that receives and serves existing cryptographic keys to users or other programs Verification scheme 816 retrieves the corresponding private key from Key manager 818 for verification of solution registry 812 solution metadata 814.

If the solution registry 812 or the solution meta-data 814 or the requested parts of 812 or 814 re verified by the 816, then if the integrity Is verified to be correct then 816 returns true else false 820.

Figure 9:
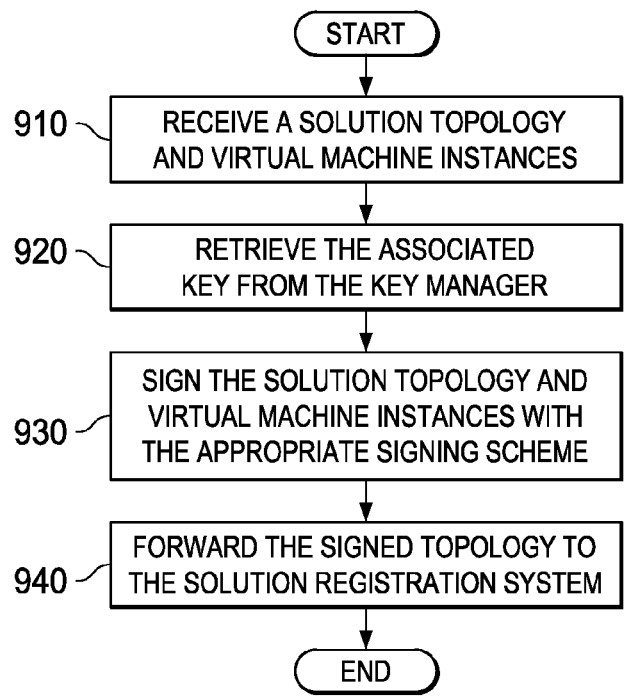
FIG. 9 is a flowchart for signing solution topologies and virtual machine instances according to an illustrative embodiment.

Referring now to FIG. 9, a flowchart for signing solution topologies and virtual machine instances is shown according to an illustrative embodiment. Process 900 is a software process executing within a signing scheme in a Solution topology signing system, such as signing scheme 414 in Solution topology signing system 400 of FIG. 4.

The process 900 begins by receiving a solution topology and virtual machine instances (step 910). The solution topology can be for example solution topology 410 of FIG. 4. The Solution topology includes a set of virtual machine instances. The Set the virtual machine instances includes one or more virtual machines. Each of the virtual machines within a set of virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Responsive to receiving the solution topology and virtual machine instance, method 900 retrieves the associated key from the key manager (step 920), and signs the solution topology and virtual machine instances with the appropriate signing scheme (step 930). The signing scheme can be for example a signing scheme such as signing scheme 414 of FIG. 4. The signing scheme is a signing policy and associated hash functions that directs the use of and subsequently uses those certain hash functions for hashing a Solution topology, including the set of virtual machine instances.

Process 900 forwards the signed topology to a solution registration system (step 940), with the process terminating thereafter. The signed topology can be, for example a signed topology such as signed topology 418 of FIG. 4. The solution registration system can be, for example a solution registration system such as solution registration 420 of FIG. 4.

The Signed topology is a hashed set of components, including the virtual machine instances, a set of cloud solutions, and the connectivity between them. The Signed topology has been signed utilizing signing scheme. Each cloud solution comprises a set of virtual machines, dependency/network connectivity between the set of virtual machines, firewall/VLAN/VPN that protects the solution, a list of cloud identifiers, and access control gateways. Each of the virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, user identifiers and application user identifiers.

Solution registration system 420 is a set of information related to registration of the solution with any listing or catalog or registry of the solutions. Some or all authorized solution is registered in this system.

Figure 10:
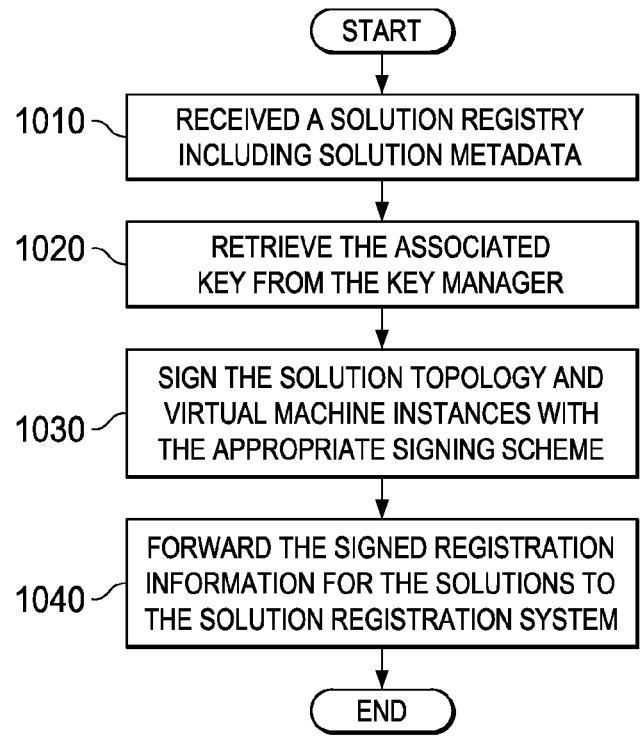
FIG. 10 is a flowchart or signing a solution registry including solution metadata according to an illustrative embodiment.

Referring now to FIG. 10, a flowchart or signing a solution registry including solution metadata is shown according to an illustrative embodiment. Process 1000 is a software process executing within a signing scheme in a Solution registry signing system, such as signing scheme 518 in solution registry signing system 500 of FIG. 5.

Process 1000 begins by receiving a solution registry, including solution metadata (step 1010). The solution registry can be solution registry such as solution registry 512 of FIG. 5. The solution registry is a hierarchical database that stores configuration settings and options for the solution of a signed topology. The Signed topology is then registered in a solution registration system. The Signed topology can be referenced with in solution registration system utilizing solution metadata of the solution registry.

The Signed topology is a hashed set of components, including the virtual machine instances, a set of cloud solutions, and the connectivity between them. Each cloud solution comprises a set of virtual machines, dependency/network connectivity between the set of virtual machines, firewall/VLAN/VPN that protects the solution, a list of cloud identifiers, and access control gateways. Each of the virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Responsive to receiving the solution topology and virtual machine instance, process 1000 retrieves the associated key from the key manager (step 1020), and signs the solution topology and virtual machine instances with the appropriate signing scheme (step 1030). The signing scheme can be a signing scheme such as signing scheme 414 of FIG. 4. The signing scheme is a signing policy and associated hash functions that directs the use of and subsequently uses those certain hash functions for hashing the Solution topology, including the set of virtual machine instances.

Process 1000 forwards a signed registration information for the solutions to solution registration system (step 1040), with the process terminating thereafter. The signed registration information for the solutions can be, for example a . . . . The solution registration system can be, for example a solution registration system such as solution registration 420 of FIG. 4.

The Signed topology is a hashed set of components, including the virtual machine instances, a set of cloud solutions, and the connectivity between them. The Signed topology has been signed utilizing a signing scheme. Each cloud solution comprises a set of virtual machines, dependency/network connectivity between the set of virtual machines, firewall/VLAN/VPN that protects the solution, a list of cloud identifiers, and access control gateways. Each of the virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, user identifiers and application user identifiers.

Solution registration system 420 is a set of information related to registration of the solution with any listing or catalog or registry of the solutions. Some or all authorized solution is registered in this system.

Figure 11:
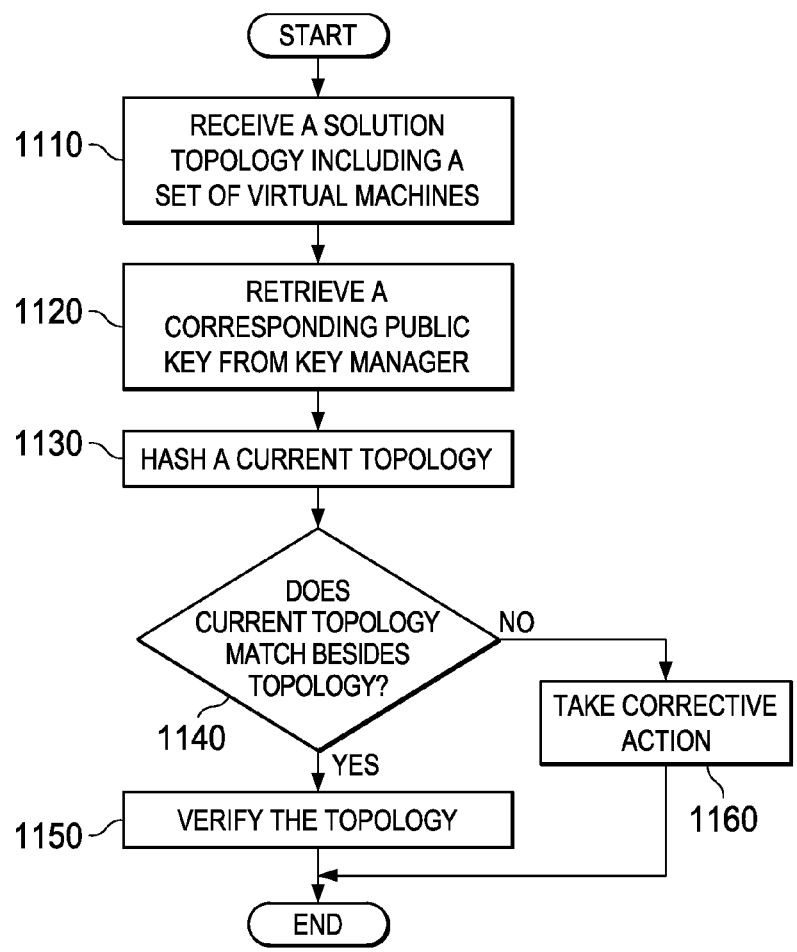
FIG. 11 is a flowchart for verifying solution topologies and virtual machine instances according to an illustrative embodiment.

Referring now to FIG. 11, a flowchart for verifying solution topologies and virtual machine instances is shown according to an illustrative embodiment. Process 1100 is a software process executing within a verification scheme in a solution registry signing system such as verification scheme 614 of FIG. 6.

Process 1100 begins by receiving a solution topology, including a set of virtual machines (step 1110). The solution topology can be a solution topology such as solution topology 610 of FIG. 6.

The Solution topology is a set of virtual machines, dependency/network connectivity between the set of virtual machines, firewall/VLAN/VPN that protects the solution, a list of cloud identifiers, and access control gateways. Each of the virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

The Solution topology includes a set of virtual machine instances. The Set of virtual machine instances includes one or more virtual machines. Each of the virtual machines within a set of virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Responsive to receiving the solution topology, process 1100 retrieves a corresponding public key from the key manager (step 1120). The key manager can be a key manager such as key manager 616 of FIG. 6. The Key manager is a computer or a server such as computer system/server 112 that receives and serves existing cryptographic keys to users or other programs.

Responsive to receiving the public key, process 1100 hashes a current topology (step 1130). The current topology is a set of virtual machines, dependency/network connectivity between the set of virtual machines, firewall/VLAN/VPN that protects the solution, a list of cloud identifiers, and access control gateways currently utilized by the running solution. Each of the virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

The current topology includes a set of virtual machine instances. The Set of virtual machine instances includes one or more virtual machines. Each of the virtual machines within a set of virtual machine instances is comprised of dynamic configuration parameters, static configuration parameters, software details, virtualization details, image identifiers, other configuration files, and user information. Dynamic configuration parameters can include, for example but not limited to, Internet protocol addresses, cloud identifiers, solution identifiers, and host names. Static configuration parameters can include, for example but not limited to, owner identifiers and administration identifiers. Software details and virtualization details and the, for example but not limited to, guess operating system identifiers, virtualization identifiers, and software versioning identifiers. Image identifiers identify identifiers that the virtual machine is instantiated, including any existing signatures if any. Other configuration files can include, for example but not limited to, a hosts file that maps those names to Internet protocol addresses, and a password file that contains a list of the system's accounts and information for those accounts such as user ID, group ID, home directory, and shell. User information can include, for example but not limited to, end user identifiers and application user identifiers.

Process 1100 then determines whether the signed topology matches the current topology (step 1140). The signed topology matches the current topology if the signature for the signed topology matches the hash of the current topology.

Responsive to determining that the current topology matches the signed topology ("yes" at step 1140), process 1100 verifies the current topology (step 1150) with the process terminating thereafter.

Responsive to determining that the current topology does not match the signed topology ("no" at step 1140), process 1100 takes further corrective action (step 1160). The corrective action can be, but is not limited to, informing a system administrator of the nonmatching of the current topology, and terminating any virtual machines within the current topology. Process 1100 terminates thereafter.

Figure 12:
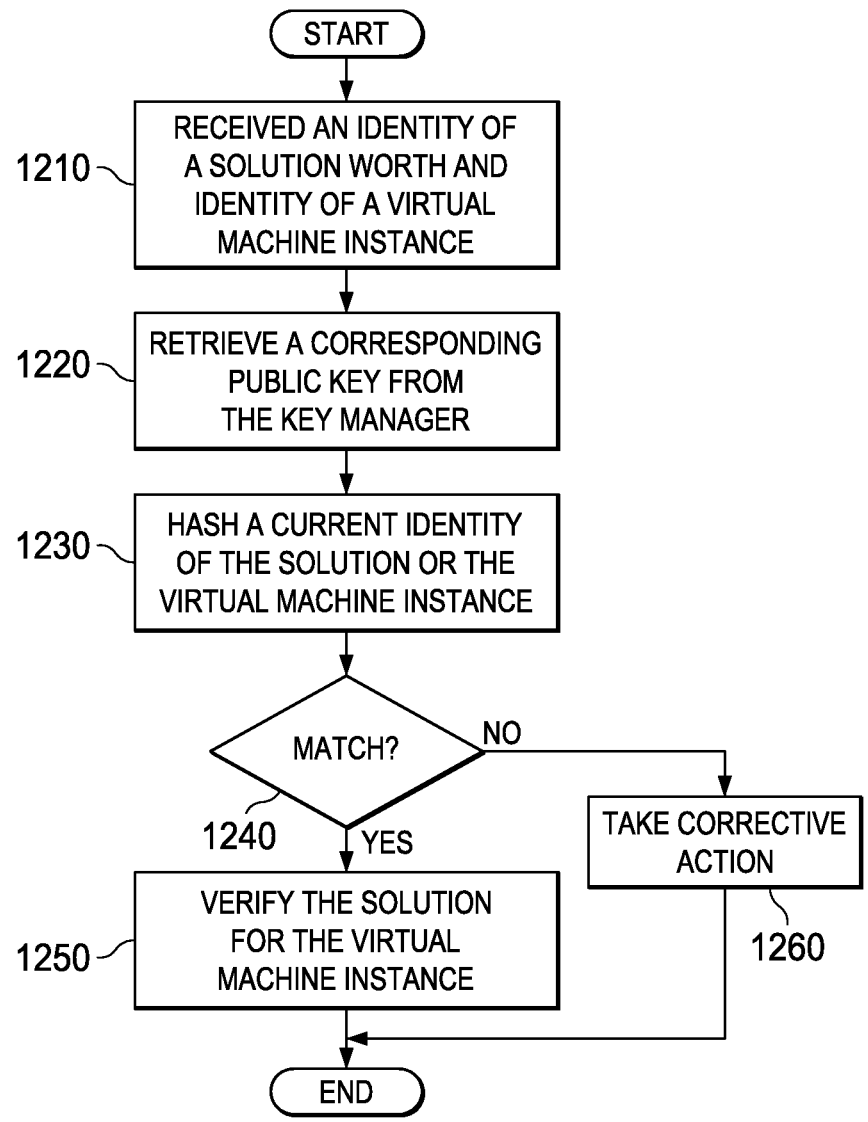
FIG. 12 is a flowchart for verifying the identity of a solution or the identity of a virtual machine instance according to an illustrative embodiment.

Referring now to FIG. 12, a flowchart for verifying the identity of a solution or the identity of a virtual machine instance is shown according to an illustrative embodiment. Process 1200 is a software process executing within a verification scheme in a solution registry signing system such as verification scheme 714 of FIG. 7.

Process 1200 begins by receiving an identity of a solution or an identity of a virtual machine instance (step 1210). The identity of the solution can be an identity of the solution such as identity of the solution 710 of FIG. 7. The identity of the virtual machine instance can be an identity of a virtual machine instance such as identity of the virtual machine instance 712 of FIG. 7.

The Identity of the solution is the signature of the solution. That is, the identity of the solution is a function of the solution, the signature of the solution, any verification objects, and the public key. Identity of the virtual machine instance is relative to the identity of the solution. That is the identity of the virtual machine instance is a function of the virtual machine instance, the signature of the solution, any verification objects, and the public key.

Responsive to receiving the solution topology, process 1200 retrieves a corresponding public key from the key manager (step 1220). The key manager can be a key manager such as key manager 716 of FIG. 7. Key manager 716 is a computer or a server such as computer system/server 112 that receives and serves existing cryptographic keys to users or other programs.

Responsive to receiving the public key, process 1200 hashes a current identity of the solution or a current identity of the virtual machine instance (step 1130). Identity of the solution 710 is the signature of the solution. That is, identity of the solution 710 is a function of the solution, the signature of the solution, any verification objects, and the public key. Identity of the virtual machine instance 712 is relative to the identity of the solution 710. That is the identity of the virtual machine instance is a function of the virtual machine instance, the signature of the solution, any verification objects, and the public key.

The identity of the solution and the identity of the virtual machine instances are forwarded to verification scheme. The verification scheme is a verification policy and an associated hash function that directs the use of and subsequently uses those certain hash functions for verifying identity of the solution is to and the identity of the virtual machine instance 712.

Process 1200 then determines whether the signed identity of the solution or identity of the virtual machine instances matches the current identity of the solution or current identity of the virtual machine instance (step 1240). The signed identity of the solution or the signed identity of the virtual machine instance matches the current identity of the solution or the current identity of the virtual machine instance if the signature for the signed identity of the solution or the signature for the signed identity of the virtual machine instance matches the hash of the current identity of the solution or the hash of the current identity of the virtual machine instance.

Responsive to determining that the signed identity of the solution or the signed identity of the virtual machine instance matches the current identity of the solution or the current identity of the virtual machine instance ("yes" at step 1240), process 1200 verifies the current identity of the solution or the current identity of the virtual machine instance (step 1250) with the process terminating thereafter.

Responsive to determining that the signed identity of the solution or the signed identity of the virtual machine instance does not match the current identity of the solution or the current identity of the virtual machine instance ("no" at step 1240), process 1200 takes further corrective action (step 1260). The corrective action can be, but is not limited to, informing a system administrator of the nonmatching of the current identity of the solution or identity of the virtual machine, and terminating any virtual machines within the current solution. Process 1200 terminates thereafter.

Figure 13:
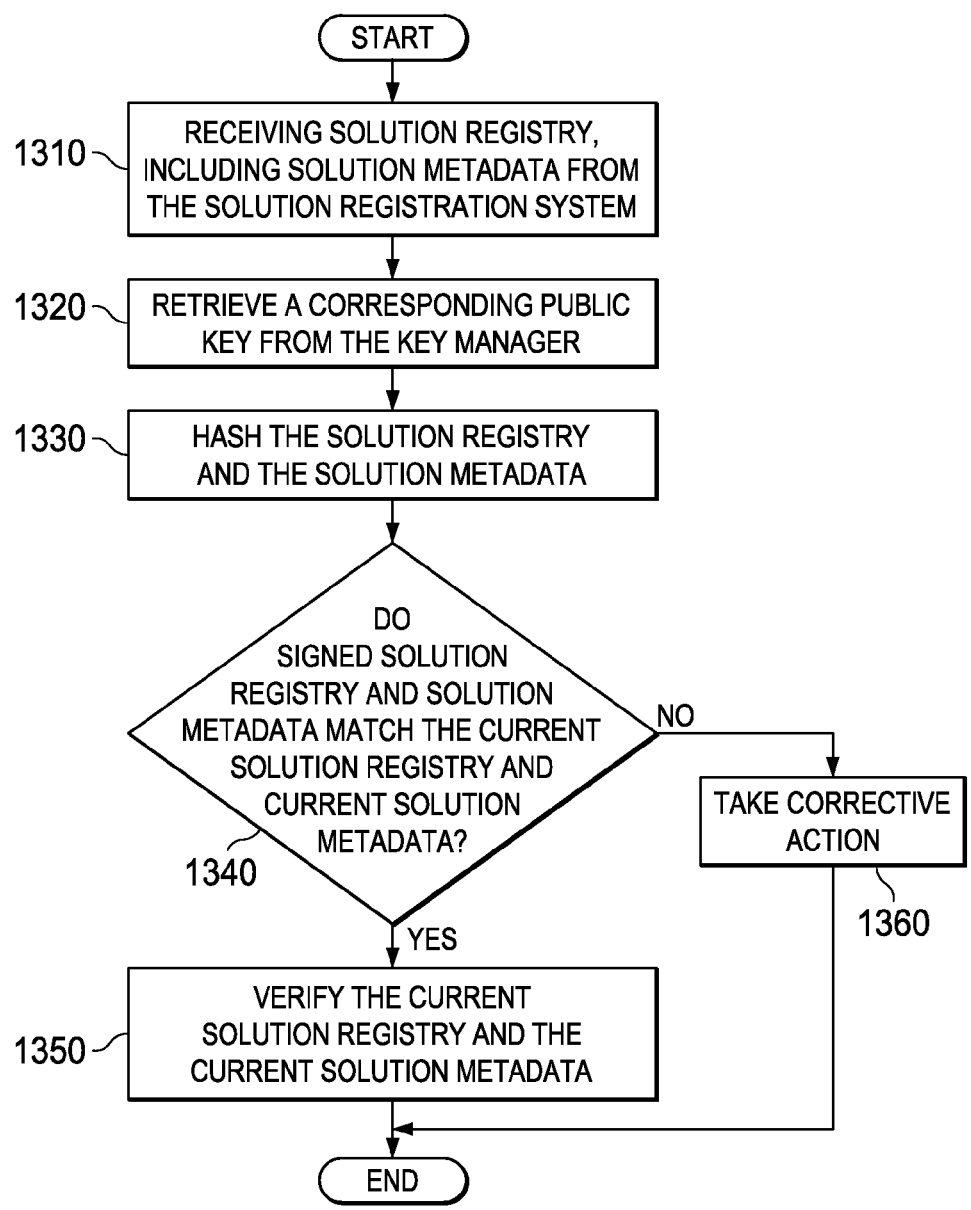
FIG. 13 is a flowchart of a process for verifying solution registries and solution metadata according to an illustrative embodiment.

Referring now to FIG. 13, a flowchart of a process for verifying solution registries and solution metadata is shown according to an illustrative embodiment. Process 1300 is a software process executing within a verification scheme in a solution registry verification system such as verification scheme 814 of FIG. 8.

Process 1300 begins when a solution registry, including solution metadata, is received from a solution registration system (step 1310). The Solution registration system is a solution registration system, such as solution registration system 810 of FIG. 8. The Solution registration system forwards the solution registry and the solution metadata to a verification scheme. The Solution registry is a hierarchical database that stores configuration settings and options for the solution of a signed topology. The Signed topology is then registered in solution registration system, such as solution registration system 810 of FIG. 8. The Signed topology can be referenced within the solution registration system utilizing the solution metadata of the solution registry.

The Solution metadata is metadata about the solution and the virtual machines there in, including such as but not limited to, a name of the virtual machine in solution, a description of the solution, and a unique identifier of the solution, such as a universally unique identifier (UUID). The Solution metadata can also include, but not limited to, configuration of the virtual machines within a solution such as the amount of virtual memory and a number of virtual CPUs.

Responsive to receiving the solution registry and the solution metadata, process 1300 retrieves a corresponding public key from the key manager (step 1320). The key manager can be a key manager such as key manager 816 of FIG. 8. The Key manager is a computer or a server such as computer system/server 112 that receives and serves existing cryptographic keys to users or other programs.

Responsive to receiving the public key, process 1300 hashes the solution registry and the solution metadata (step 1330).

Process 1300 then determines whether the signed solution registry & solution metadata match the current solution registry and current solution metadata (step 1340). The signed solution registry & solution metadata match the current solution registry and current solution metadata if the signature for the signed solution registry & solution metadata matches the hash of the current solution registry and current solution metadata.

Responsive to determining that the signed solution registry & solution metadata match the current solution registry and current solution metadata ("yes" at step 1340), process 1300 verifies current solution registry and current solution metadata (step 1350) with the process terminating thereafter.

Responsive to determining that the signed solution registry & solution metadata does not match the current solution registry and current solution metadata ("no" at step 1340), process 1300 takes further corrective action (step 1360). The corrective action can be, but is not limited to, informing a system administrator of the nonmatching of the current solution registry and current solution metadata, and terminating any virtual machines within the current solution. Process 1300 terminates thereafter.

Thus, illustrative embodiments of the present invention provide a computer implemented method to verify an integrity of a solution. The computer implemented method comprises hashing, by a computer, a set of virtual machine instances in a solution topology of the solution. The computer hashes a set of connections in the solution topology. The set of connections comprising a connection between ones of the set of virtual machine instances, a connection between a first component of a first one of the set of virtual machine instances and a second component of a second one of the set of virtual machine instances, and combinations thereof. The computer hashes a set of solution-specific information, and then signs the hashes to create a first signed topology.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen best to explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for verifying an integrity of a solution, the computer program product comprising:
 a computer readable storage medium having computer readable program code embodied therewith, the computer readable program code comprising:

computer readable program code configured to hash a set of virtual machine instances in a solution topology of the solution;

computer readable program code configured to hash a set of connections in the solution topology, the set of connections comprising a connection between ones of the set of virtual machine instances, a connection between a first component of a first one of the set of virtual machine instances and a second component of a second one of the set of virtual machine instances, and combinations thereof;

computer readable program code configured to hash a set of solution-specific information;

computer readable program code configured to sign the hashes to create a first signed topology;

computer readable program code configured to incorporate the first signed topology into a solution registry that is a hierarchical database that stores configuration settings and options for the solution of the first signed topology, wherein the solution registry includes solution metadata, and wherein the solution metadata include a name of the set of virtual machine instances in the solution, a description of the solution, and a unique identifier of the solution; and computer readable program code configured to sign the solution registry incorporating the first signed topology and to sign the solution metadata included in the solution registry.

2. The computer program product of claim 1, wherein the computer readable program code configured to hash the set of virtual machine instances further comprises:

computer readable program code configured to hash the set of virtual machine instances in the solution topology of the solution, each of the set of virtual machine instances comprising dynamic configuration parameters, static configuration parameters, software details, virtualization details, image identifications, existing signatures, configuration files, and user information.

3. The computer program product of claim 2, wherein the dynamic configuration parameters are selected from a group consisting of Internet protocol addresses, cloud identities, solution identities, host names, and combinations thereof.

4. The computer program product of claim 3, wherein a solution identity is a function of the solution, a solution signature, a verification object, and a key.

5. The computer program product of claim 2, wherein the static configuration parameters are selected from a group consisting of owner identities, administration identities, and combinations thereof.

6. The computer program product of claim 2, wherein the software details and virtualization details are selected from a group consisting of guest operating systems, virtualization identities, and combinations thereof.

7. The computer program product of claim 2, wherein a virtual machine identity is a function of a virtual machine instance, a solution signature, a verification object, and a key.

8. The computer program product of claim 1, wherein hashing the set of virtual machine instances, hashing the set of connections in the solution topology, and hashing the set of solution-specific information comprise one of hashing as a tree or hashing as a graph.

9. The computer program product of claim 1, wherein signing the hashes further comprises signing the hashes to create the first signed topology, and wherein a signing scheme is selected from an RSA signing scheme, a DSA signing scheme, a composite signature signing scheme, and an aggregate signature signing scheme.

10. The computer program product of claim 1, the computer readable program code further comprising:

computer readable program code configured to receive a second signed topology;

computer readable program code configured to compare the first signed topology to the second signed topology; and computer readable program code configured, responsive to the second signed topology being equal to the first signed topology, to verify the integrity of the solution.

11. A computer comprising:

a storage having computer readable program code embodied therewith for verifying an integrity of a solution;

a bus connecting the storage to a processor; and a processor, wherein the processor executes the computer readable program code: to hash a set of virtual machine instances in a solution topology of the solution; to hash a set of connections in the solution topology, the set of connections comprising a connection between ones of the set of virtual machine instances, a connection between a first component of a first one of the set of virtual machine instances and a second component of a second one of the set of virtual machine instances, and combinations thereof; to hash a set of solution-specific information; to sign the hashes to create a first signed topology; to incorporate the first signed topology into a solution registry that is a hierarchical database that stores configuration settings and options for the solution of the first signed topology, wherein the solution registry includes solution metadata, and wherein the solution metadata include a name of the set of virtual machine instances in the solution, a description of the solution, and a unique identifier of the solution; and to sign the solution registry incorporating the first signed topology and to sign the solution metadata included in the solution registry.

12. The computer of claim 11, wherein the processor executing the computer readable program code to hash the set of virtual machine instances further comprises the processor executing the computer readable program code:

to hash the set of virtual machine instances in the solution topology of the solution, each of the set of virtual machine instances comprising dynamic configuration parameters, static configuration parameters, software details, virtualization details, image identifications, existing signatures, configuration files, and user information.

13. The computer of claim 12, wherein the dynamic configuration parameters are selected from a group consisting of Internet protocol addresses, cloud identities, solution identities, host names, and combinations thereof.

14. The computer of claim 12, wherein the static configuration parameters are selected from a group consisting of owner identities, administration identities, and combinations thereof.

15. The computer of claim 12, wherein the software details and virtualization details are selected from a group consisting of guest operating systems, virtualization identities, and combinations thereof.

16. The computer of claim 13, wherein a solution identity is a function of the solution, a solution signature, a verification object, and a key.

17. The computer of claim 12, wherein a virtual machine identity is a function of a virtual machine instance, a solution signature, a verification object, and a key.

18. The computer of claim 11, wherein hashing the set of virtual machine instances, hashing the set of connections in the solution topology, and hashing the set of solution-specific information comprise one of hashing as a tree or hashing as a graph.

19. The computer of claim 11, wherein signing the hashes further comprises signing the hashes to create the first signed topology, and wherein a signing scheme is selected from an RSA signing scheme, a DSA signing scheme, a composite signature signing scheme, and an aggregate signature signing scheme.

20. The computer of claim 11, wherein the processor further executes the computer readable program code:
to receive a second signed topology; to compare the first signed topology to the second signed topology; and to verify the integrity of the solution in response to the second signed topology being equal to the first signed topology.

21. A computer implemented method to verify an integrity of a solution, the computer implemented method comprising:
hashing, by a computer, a set of virtual machine instances in a solution topology of the solution;
hashing, by the computer, a set of connections in the solution topology, the set of connections comprising a connection between ones of the set of virtual machine instances, a connection between a first component of a first one of the set of virtual machine instances and a second component of a second one of the set of virtual machine instances, and combinations thereof;
hashing, by the computer, a set of solution-specific information;
signing, by the computer, the hashes to create a first signed topology;
incorporating, by the computer, the first signed topology into a solution registry that is a hierarchical database that stores configuration settings and options for the solution of the first signed topology, wherein the solution registry includes solution metadata, and wherein the solution metadata include a name of the set of virtual machine instances in the solution, a description of the solution, and a unique identifier of the solution; and
signing, by the computer, the solution registry incorporating the first signed topology and to sign the solution metadata included in the solution registry.

22. The computer implemented method of claim 21, wherein the step of hashing the set of virtual machine instances further comprises:
hashing, by the computer, the set of virtual machine instances in the solution topology of the solution, each of the set of virtual machine instances comprising dynamic configuration parameters, static configuration parameters, software details, virtualization details, image identifications, existing signatures, configuration files, and user information.

23. The computer implemented method of claim 22, wherein the dynamic configuration parameters are selected from a group consisting of Internet protocol addresses, cloud identities, solution identities, host names, and combinations thereof.

24. The computer implemented method of claim 22, wherein the static configuration parameters are selected from a group consisting of owner identities, administration identities, and combinations thereof.

25. The computer implemented method of claim 22, wherein the software details and virtualization details are selected from a group consisting of guest operating systems, virtualization identities, and combinations thereof.

* * * * *